United States Patent [19]

Joo et al.

[11] Patent Number: 5,821,683
[45] Date of Patent: Oct. 13, 1998

[54] CATHODE ASSEMBLY HAVING THERMION EMITTER OF CERMET PALLET

[75] Inventors: Kyu-nam Joo; Jong-seo Choi; Geun-bae Kim; Kwi-seuk Choi; Sang-won Lee, all of Suwon, Rep. of Korea

[73] Assignee: Samsung Display Devices Co., Ltd., Kyungki-Do, Rep. of Korea

[21] Appl. No.: 794,586

[22] Filed: Feb. 3, 1997

[30]   Foreign Application Priority Data

May 2, 1996 [KR]   Rep. of Korea ............... 1996-2695

[51] Int. Cl.⁶ ..................................................... H01J 1/15
[52] U.S. Cl. ............. 313/346 R; 313/446; 313/346 DC; 313/270
[58] Field of Search .................. 313/346 R, 446, 313/270, 346 DC, 341

[56]   References Cited

U.S. PATENT DOCUMENTS 3,745,403   7/1973   Misumi ................................. 313/341

*Primary Examiner*—Vip Patel
*Attorney, Agent, or Firm*—Leydig, Voit & Mayer

[57]   ABSTRACT

The present invention relates to a cathode assembly employing a cermet pellet and a method for manufacturing the same. The cathode assembly of the present invention has a good quality such as a low work function and an enhanced life span as compared with the conventional cathode assembly. Also, since the method for manufacturing a cermet pellet is more simplified than that of the cermet thin film, the cathode assembly employing the cermet pellet according to the present invention can be manufactured with ease and at a low cost.

2 Claims, 1 Drawing Sheet

CATHODE ASSEMBLY HAVING THERMION EMITTER OF CERMET PALLET

BACKGROUND OF THE INVENTION

The present invention relates to a cathode assembly and a method for manufacturing the same, and more particularly, to a cathode assembly employing a cermet pellet as a thermion emitter, and a method for manufacturing the same.

The cathode assembly used in an electron tube such as a cathode-ray tube (CRT)or image pickup tube is classified into an indirectly heated cathode assembly and a directly heated cathode assembly depending on heating type.

Of those cathode assemblies, the indirectly heated cathode assembly includes an oxide cathode assembly and an impregnation type cathode assembly.

FIG. 1 is a sectional view illustrating an usual oxide cathode assembly.

In general, the oxide cathode assembly comprises a disk-like base metal 2, a cylindrical sleeve 3 which is fitted to the lower part of the base metal 2 for support and is internally provided with a heater 4 for heating the cathode assembly, and a thermion emitter 1 which is coated on the base metal.

Such an oxide cathode assembly can be used at a relatively low temperature (700°–800° C.) owing to its low work function. Although such an advantage is obtained, the oxide cathode assembly still has some problems. First, since the oxide cathode assembly is made of a semiconductive material having a high electrical resistance, it can be deteriorated at a high thermion-emitting density. Second, the formation of a resistance layer between the base metal and the thermion emitter results in the reduction of the life span of the cathode assembly.

The impregnation type cathode assembly is formed by impregnating thermion emitting material such as barium carbonate, strontium carbonate or calcium carbonate into the porous tungsten. Although such impregnation type cathode assembly has a high electrical current density and an enhanced life span, there are some problems in that its manufacturing processes are complicated and thus the production cost is increased.

On the contrary, the directly heated cathode assembly comprises a thermion emitter and a filament for supporting and heating the thermion emitter. Here, the filament is in contact with a electric current source so as to apply electric current to the thermion emitter and then directly heat it. Thus, the directly heated cathode assembly generates high density of thermion in a very short term after applying electric current. The directly heated cathode assembly also has an enhanced life span.

Of such directly heated cathode assemblies, there is a directly heated cathode assembly employing a thermion emitter made of a cermet such as $Cr_3Si$. The cermet is a composite of ceramics and metals, and therefore has a good thermal resistance and strength. Thus, a cathode assembly employing the cermet may have a low work function and an enhanced life span property. Up to now, however, the cermet in the shape of a thin film (hereinafter, to be referred "cermet thin film") has been used as a thermion emitter. Here, the cermet thin film is manufactured by sputtering chrome atoms and silicon atoms at the same time. However, such sputtering method is intricate and a cermet thin film is not suitable for a thermion emitter. This is the reason that the cermet has not been widely used as a thermion emitter for a cathode assembly.

SUMMARY OF THE INVENTION

An object of the present invention is to provide a cathode assembly employing a cermet pellet, which is a cermet in a pellet form, as a thermion emitter.

To achieve the above object, the present invention provides a cathode assembly comprising a thermion emitter and a filament for supporting and heating said thermion emitter, wherein said thermion emitter is a cermet pellet comprising chromium silicide and silicon dioxide.

Another object of the present invention is to provide a method for manufacturing a cathode assembly employing a cermet pellet as a thermion emitter using a mechanical alloying process, so as to obtain a cathode assembly having a good property with ease and at a low cost.

To achieve the above second object of the present invention, a method for manufacturing a cathode assembly employing a cermet pellet comprising the steps of: a) mechanically alloying a chrome powder and a silicon powder to prepare a chromium silicide powder; b) mechanical alloying said chromium silicide powder and a silicon dioxide ($SiO_2$) powder to prepare a cermet powder; c) mixing said cermet powder and a binder and shaping the reactant mixture with a pressure to form a cermet pellet; d) heat-treating said cermet pellet under a vacuum condition to remove gases in the pellet; e) additionally heat-treating said cermet pellet to homogenize the cermet powder in the pellet; and f) fitting a filament to said cermet pellet.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
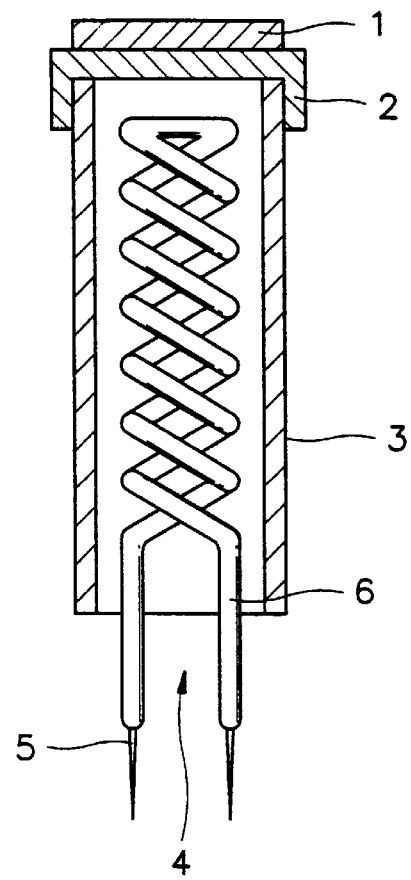
FIG. 1 is a sectional view of an usual oxide cathode assembly.
Figure 2:
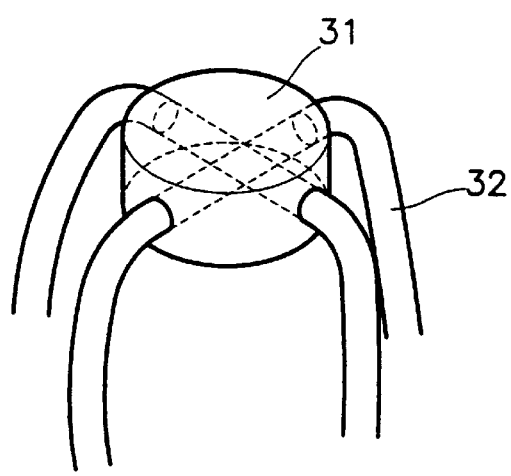
FIG. 2 is a perspective view of a cathode assembly according to an embodiment of the present invention.

FIG. 2 shows a cathode assembly according to one embodiment of the present invention. As shown in FIG. 2, the cathode assembly of the present invention includes a thermion emitter (21) and a filament (22), wherein the thermion emitter (21) is a cermet pellet comprising chromium silicide and silicon dioxide in a weight ratio of 1:1–9:1. Here, a diameter of the cermet pellet is 0.9–1.5 mm.

The filament (32) is attached to the thermion emitter (31) on one end to support the thermion emitter (31). Further, it is welded with an electric current source (not shown). on the other end to apply electric current to the thermion emitter (31) and directly heat it. In general, such filament is made of a tungsten wire, and is attached to the thermion emitter (31) in the same configuration as the conventional one. For example, the filament is perforated into the thermion emitter, or attached to the bottom surface of the thermion emitter by welding, if necessary, with intervening metal plate between the filament and the thermion emitter.

On the other hand, according to the method for manufacturing the cathode assembly of the present invention, in step a), the mechanical alloying treatment comprises steps of: placing the chrome powder and the silicon powder in a mole ratio of 3:1 into a reactor, rotating the reactor at a speed of 300–700 rpm for 10–50 hours, and heat-treating the reactant mixture at a temperature of 600°–1,000° C. for 0.5–2 hours. Also, in step a), a process controlling agent such as stearic acid or methanol can be further added in an amount of 1–3 wt %, based on the total weight of the chrome powder and the silicon powder.

In step b), the mechanical alloying treatment comprises steps of: placing the chromium silicide powder and the silicon dioxide powder in a weight ratio of 1:1–9:1 into a reactor, rotating the reactor at a speed of 100–400 rpm for 3–24 hours, and heat-treating the reactant mixture at a temperature of 1,000°–1,700° C. for 0.5–5 hours. Here, the silicon dioxide powder is added for reducing the work function value to less than 1 ev.

In step c), any type of binder can be used if it is a conventionally used one. Preferably, the binder is one of waxes or alcohols such as polyvinyl alcohol (PVA). Further, the cermet pellet is preferably shaped into a pellet form having a diameter of 0.9–1.5 mm under a pressure of 3–8 ton/cm$^2$.

In step d), the cermet pellet is heat-treated at a temperature of 400°–700° C. for 0.5–3 hours to remove gases in the cermet pellet.

In step e), the cermet pellet is additionally heat-treated at a temperature of 1,300°–1,800° C. for 1–100 hours to homogenize the cermet powder in the pellet.

Finally, in step f), the filament can be attached to the thermion emitter in the same configuration as the conventional one, for example, the filament is perforated into the thermion emitter, or attached to the bottom surface of the thermion emitter by welding, if necessary, with intervening metal plate between the filament and the thermion emitter.

The mechanical alloying treatment has advantages that the reaction powder is finely pulverized and thus homogeneously mixed, and the heat-treatment is carried out at a lower temperature than a melting point of the reactant. Thus, according to the manufacturing method of the present invention employing the mechanical alloying treatment, the cathode assembly can be manufactured with ease and at a low cost. Also, the cathode assembly of the present invention has a cermet pellet having a low work function value and a high electrical current density as a thermion emitter, thereby enhancing properties, for example, long life span.

Hereinafter, the preparation process will be explained through the following examples, but the invention is not limited thereto.

EXAMPLE 1

Here, 16.96 g of chrome powder and 3.026 g of silicon powder were placed in a ball mill reactor, to which 100 wt % of balls and 3 wt % of stearic acid were filled, based on the total weight of chrome powder and silicon powder. The reactor was rotated at a speed of 500 rpm for 30 hours, and the reactant mixture was then heat-treated at 800° C. for 1 hours to obtain Cr$_3$Si powder.

The Cr$_3$Si powder and SiO$_2$ powder (weight ratio of Cr$_3$Si and SiO$_2$ is 9:1) was placed in the reactor. The reactor was rotated at 400 rpm for 6 hours and the reactant mixture was then heat-treated at 900° C. for 2 hours to prepare cermet powder.

Thereafter, the cermet powder was mixed with polyvinyl alcohol and pressed with a pressure of 5 ton/cm$^2$ to form the cermet powder into a shape of a pellet having a diameter of 1.0 mm.

Then, the cermet pellet was heat-treated at 650° C. for 1 hours under a vacuum condition to remove gases in the pellet, and additionally heat-treated at 1,400° C. for 3 hours to homogenize the cermet powder in the pellet.

Finally, a tungsten wire was perforated into the cermet pellet to form a cathode assembly.

With respect to the cathode assembly, a work function and an electrical current density at an operating temperature (1,200° C.) was measured.

For comparison, the work function and electrical current density at an operating temperature were measured with respect to the usual oxide cathode assembly. The results were shown in Table 1.

<TABLE 1>

|  | cathode assembly of the present invention | oxide cathode assembly |
|---|---|---|
| electrical current density | 30 mA/cm$^2$ | 1.2 mA/cm$^2$ |
| work function value | 0.8 ev | 1.4 ev |

As shown in Table 1, in comparison to the usual oxide cathode assembly, a cathode assembly employing a cermet pellet according to the present invention has an improved quality, that is, a low work function and an enhanced life span. Also, since the method for manufacturing a cermet pellet is more simplified than that of the cermet thin film, the cathode assembly employing the cermet pellet according to the present invention can be manufactured with ease and at a low cost.

What is claimed is:

1. A cathode assembly comprising a thermion emitter and a filament for supporting and heating said thermion emitter, wherein said thermion emitter is a cermet pellet comprising chromium silicide and silicon dioxide.

2. A cathode assembly as claimed in claim 1, wherein a weight ratio of said chromium silicide and said silicon dioxide is 1:1–9:1.

* * * * *